(12) United States Patent
McIlwraith

(10) Patent No.: US 6,397,967 B1
(45) Date of Patent: Jun. 4, 2002

(54) SKID STEER VEHICLE

(75) Inventor: Douglas William McIlwraith, Queensland (AU)

(73) Assignee: Jaden Charters Pty Ltd., Burleigh Heads (AU)

( * ) Notice: Subject to any disclaimer, the term of this patent is extended or adjusted under 35 U.S.C. 154(b) by 0 days.

(21) Appl. No.: 09/470,331

(22) Filed: Dec. 22, 1999

(30) Foreign Application Priority Data

Dec. 23, 1998 (AU) ............................................ PP 7865

(51) Int. Cl.⁷ .............................................. B60K 17/10
(52) U.S. Cl. ....................... 180/308; 180/306; 180/291; 180/6.48; 180/326; 180/334
(58) Field of Search ................................ 180/291, 305, 180/306, 308, 326, 329, 334, 89.12, 89.13, 89.17, 89.18, 6.3, 6.48; D15/25

(56) References Cited

U.S. PATENT DOCUMENTS

| | | | | |
|---|---|---|---|---|
| D195,254 S | * | 5/1963 | Keller | D15/25 |
| 3,797,211 A | * | 3/1974 | Turner | 56/15.6 |
| 3,850,473 A | * | 11/1974 | Huber | 296/203 |
| 3,933,216 A | * | 1/1976 | Irwin | 180/89.17 |
| 4,193,468 A | * | 3/1980 | Riddle et al. | 180/89.17 |
| 4,312,418 A | * | 1/1982 | Rittman | 180/69.21 |
| 4,366,881 A | * | 1/1983 | Frisbee | 180/271 |
| 4,709,736 A | * | 12/1987 | Bellars | 144/24.12 |
| D294,032 S | * | 2/1988 | Whiffin | D15/25 |
| 4,773,494 A | * | 9/1988 | Anderson | 180/6.48 |
| 4,971,092 A | * | 11/1990 | Parry et al. | 137/351 |
| 5,303,792 A | * | 4/1994 | Shimizu | 180/89.17 |
| 5,312,119 A | * | 5/1994 | Schneider et al. | 280/6.1 |
| D359,497 S | * | 6/1995 | Rayner | D15/25 |
| 5,440,878 A | * | 8/1995 | Gleasman et al. | 60/487 |
| 5,520,258 A | * | 5/1996 | Kemshall | 180/68.5 |
| 5,730,239 A | * | 3/1998 | Holter | 180/69.21 |
| 6,076,619 A | * | 6/2000 | Hammer | 180/6.48 |
| D431,574 S | * | 10/2000 | Porter | D15/25 |
| D438,218 S | * | 2/2001 | McIlwraith | D15/25 |
| 6,290,474 B1 | * | 9/2001 | Bavendiek et al. | 417/423.3 |

OTHER PUBLICATIONS

Kanga Kid, http://kanga–loader.com/new/kidover.html, accessed Jun. 11, 2001.*

Toro Dingo 320D, http://www.tor.com/landscape/sitework/dingo320d.html, accessed Jun. 11, 2001.*

* cited by examiner

*Primary Examiner*—J. J. Swann
*Assistant Examiner*—David Divine
(74) *Attorney, Agent, or Firm*—Knobbe, Martens, Olson & Bear, LLP.

(57) ABSTRACT

A skid-steer mini-loader (10) has a compact chassis formed by two side walls (11,12) fixed to either side of a tank (13) which forms an oil reservoir for a hydraulic drive system for the mini-loader. A hydraulic pump (30) is located within the tank (13), and is driven by a motor (31) mounted directly on top of the tank. A panel (19), which forms the rear wall and top of a cover for the power plant, is pivotally mounted at its lower end to the chassis, enabling the panel (19) to be opened out and allow access to the power plant. The mini-loader has a lifting arm (17) of inverted channel configuration with a relatively wide central web which forms the front face of the arm. The lifting arm has a mounting plate (16) pivotally mounted at its free end for mounting a bucket (15) or other attachment. A toggle arm (34) is provided on the mounting plate (16) for automatically locking the attachment to the mounting plate. A self-levelling mechanism is concealed under the front face of the lifting arm, and has a sprocket (38) at the pivot axis of the lifting arm, a sprocket (36) at the pivot axis of the mounting plate, and a chain (37) interconnecting the two sprockets.

20 Claims, 5 Drawing Sheets

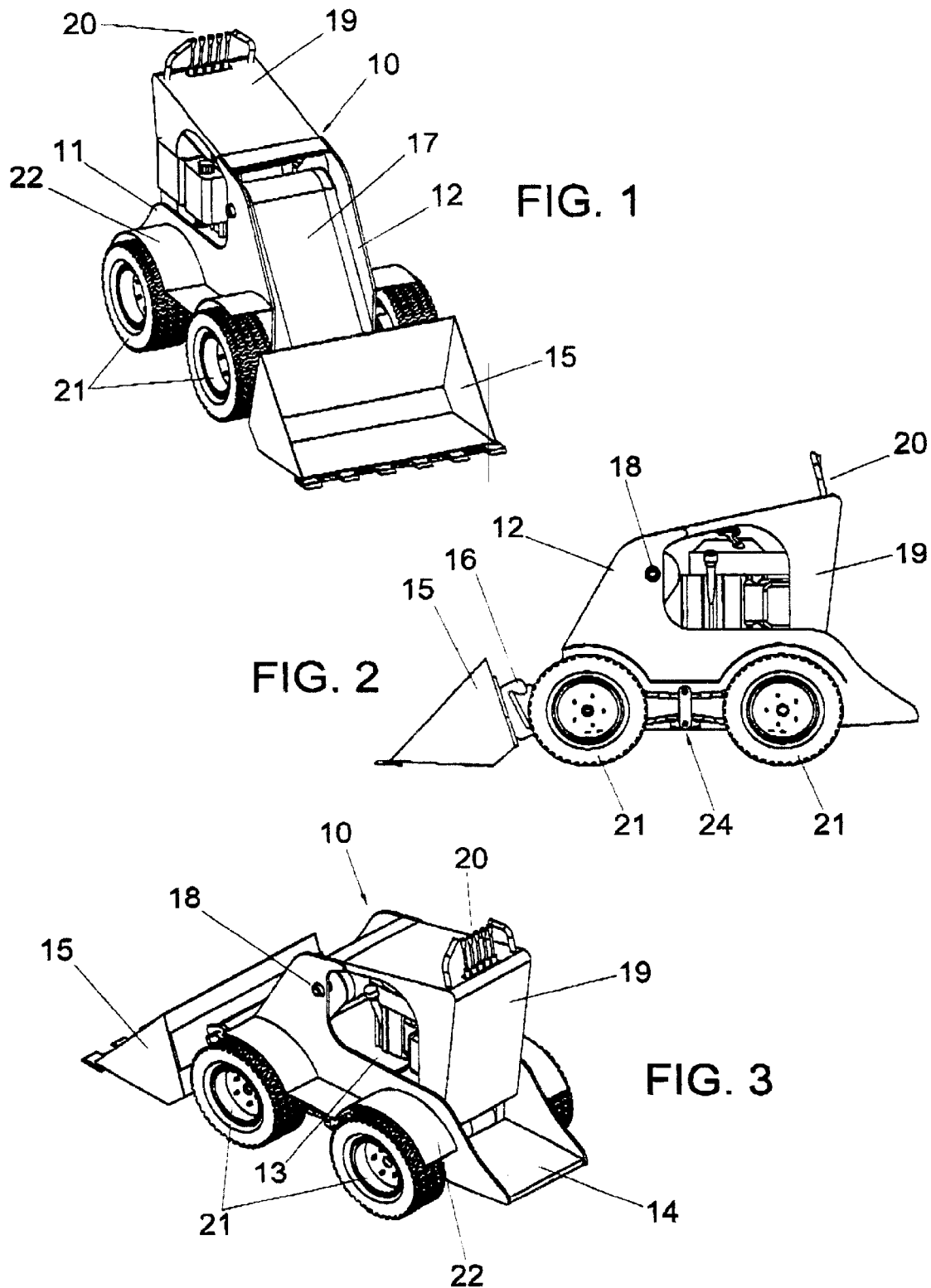

SKID STEER VEHICLE

THIS INVENTION relates to improvements in skid-steer vehicles. In particular, the invention is directed to a compact multi-purpose skid-steer mini-loader.

BACKGROUND ART

There are various types of known skid-steer loaders, perhaps the most popular being that sold under the trade mark BOBCAT™. The popularity of these loaders is due, at least in part, to their manoeuverability and versatility. The hydraulic skid-steer drive enables the loader to turn sharply, and eliminates the need for complex steering and gearing mechanisms. The interchangeability of the loader bucket with other tools, such as a posthole digger, trench digger, rotary sweeper, etc. enables a single machine to provide a variety of functions.

In recent years, a smaller, stand-on version of the skid-steer loader has become popular for lighter tasks and/or operation in confined places. Examples of these smaller loaders, commonly known as "mini-loaders" are those sold under the trade marks KANGA™ (in the United States of America) and JADEN™ (in Australia).

This invention relates to improvements in skid-steer vehicles, particularly, although not solely, skid-steer vehicles of the mini-loader type.

SUMMARY OF THE INVENTION

This invention therefore provides a vehicle, typically a skid-steer mini-loader, having one or more of the following improvements.

In a first improvement, the vehicle has a power plant comprising a tank serving as a reservoir for hydraulic fluid, a hydraulic pump located within the tank, and a motor (typically an internal combustion engine) mounted on top of the tank, the motor driving the pump via an upright shaft projecting into the tank.

By locating the pump within the tank, and mounting the engine on top of the tank, a very compact arrangement of engine/pump/tank is achieved. This enables the overall size of the vehicle to be minimised. In particular, the above-described arrangement allows mini-loaders to be constructed of smaller size than hitherto known mini-loaders of comparable power rating.

In a second improvement, the vehicle is provided with a pivoting panel which facilitates access to the engine bay in which the power plant is located. This pivoting panel is typically the console panel, and is angled or 7-shaped, forming the rear wall and top of a cover for the power plant. By pivoting open the console panel, the engine bay is exposed, thereby facilitating insertion, removal and servicing of the engine, pump and associated components.

In a third improvement, the vehicle chassis comprises two spaced parallel side walls, typically steel plates, fixed to either side of the tank which forms the oil reservoir for the vehicle hydraulic drive system. The side walls themselves may constitute opposite side walls of the tank.

The use of the oil reservoir tank as part of the chassis enables the chassis to be constructed in compact form and reduces the amount of material required, yet still allows the chassis to have the required strength and rigidity.

According to a fourth improvement, the vehicle is provided with a lifting arm for a bucker, scoop or other attachment, the arm being generally of inverted channel configuration and having a relatively wide central web. The web forms the front face of the arm which is located at the front of the vehicle. Hence, from the front of the vehicle, the arm appears as a single wide flat plate, creating an aesthetically pleasing appearance. The flat web of the arm also protects hydraulic equipment and the bucket self-levelling mechanism (described later) which are located under the arm.

According to a fifth improvement, a self-levelling mechanism is provided in association with the bucket arm to automatically maintain the bucket or other attachment at a constant orientation (relative to the horizontal) as the arm is raised and lowered. The automatic levelling mechanism comprises a first sprocket connected to the bucket mounting plate and rotatable therewith about its pivot axis, and a second sprocket mounted on the vehicle, typically with its axis collinear the pivot axis of the bucket arm. The first and second sprockets are connected by an endless chain, which may include rigid linkages.

The second sprocket is held stationary (to maintain the bucket or other attachment at a constant orientation). That is, due to the interconnection of the two sprockets, as the bucket arm is rotated, the mounting plate sprocket is turned (slightly) by the chain connected to the (fixed) second sprocket to counteract the rotation of the first sprocket relative to the second sprocket which would otherwise occur due to rotation of the lifting arm. This maintains the bucket or other attachment at a substantially constant orientation.

A hydraulic cylinder is connected to the second sprocket for tilting the bucket/attachment as and when required. Rotation of the second sprocket by the hydraulic cylinder causes a corresponding rotation of the first sprocket, and hence, the orientation of the bucket/attachment is changed, e.g. to empty the bucket.

By utilising a chain and sprocket arrangement, the bucket levelling mechanism can be housed under the flat bucket arm (and substantially concealed from view). Unlike known bucket levelling mechanisms which comprise rigid linkages protruding above the bucket arm, the bucket levelling mechanism of this invention can be concealed under the arm.

According to a sixth improvement, a "quick hitch" locking mechanism is provided for mounting an attachment, such as a bucket, to a mounting plate on the arm. This mechanism includes at least one toggle arm on the rear of the mounting plate which automatically locks the attachment to the mounting plate when the mounting plate is inserted into mounting brackets on the attachment. In this manner, the attachment may be mounted and locked to the mounting plate remotely by the vehicle operator by manoeuvering the mounting plate into the mounting brackets on the attachment.

Other features and advantages of the invention will become apparent from the following description of a preferred embodiment of the invention.

BRIEF DESCRIPTION OF THE DRAWINGS

FIG. 1 is a front perspective view of a mini-loader according to one embodiment of the invention, FIG. 2 is a side elevation of the mini-loader of FIG. 1, FIG. 3 is a rear perspective view of the mini-loader of FIG. 1.

DESCRIPTION OF PREFERRED EMBODIMENT

Figure 4:
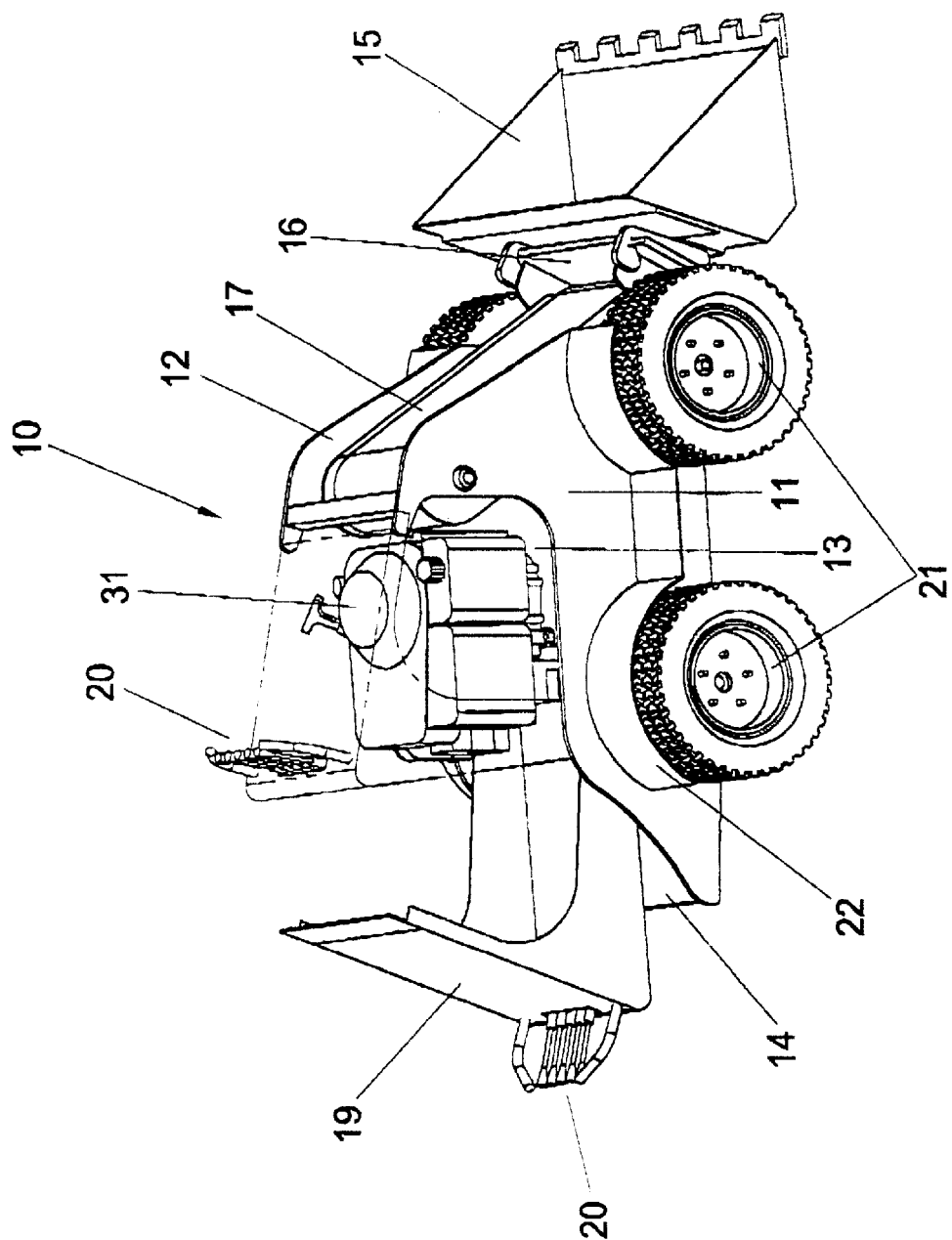
FIG. 4 is a side perspective view of the mini-loader of FIG. 1, with console panel opened.
Figure 5:
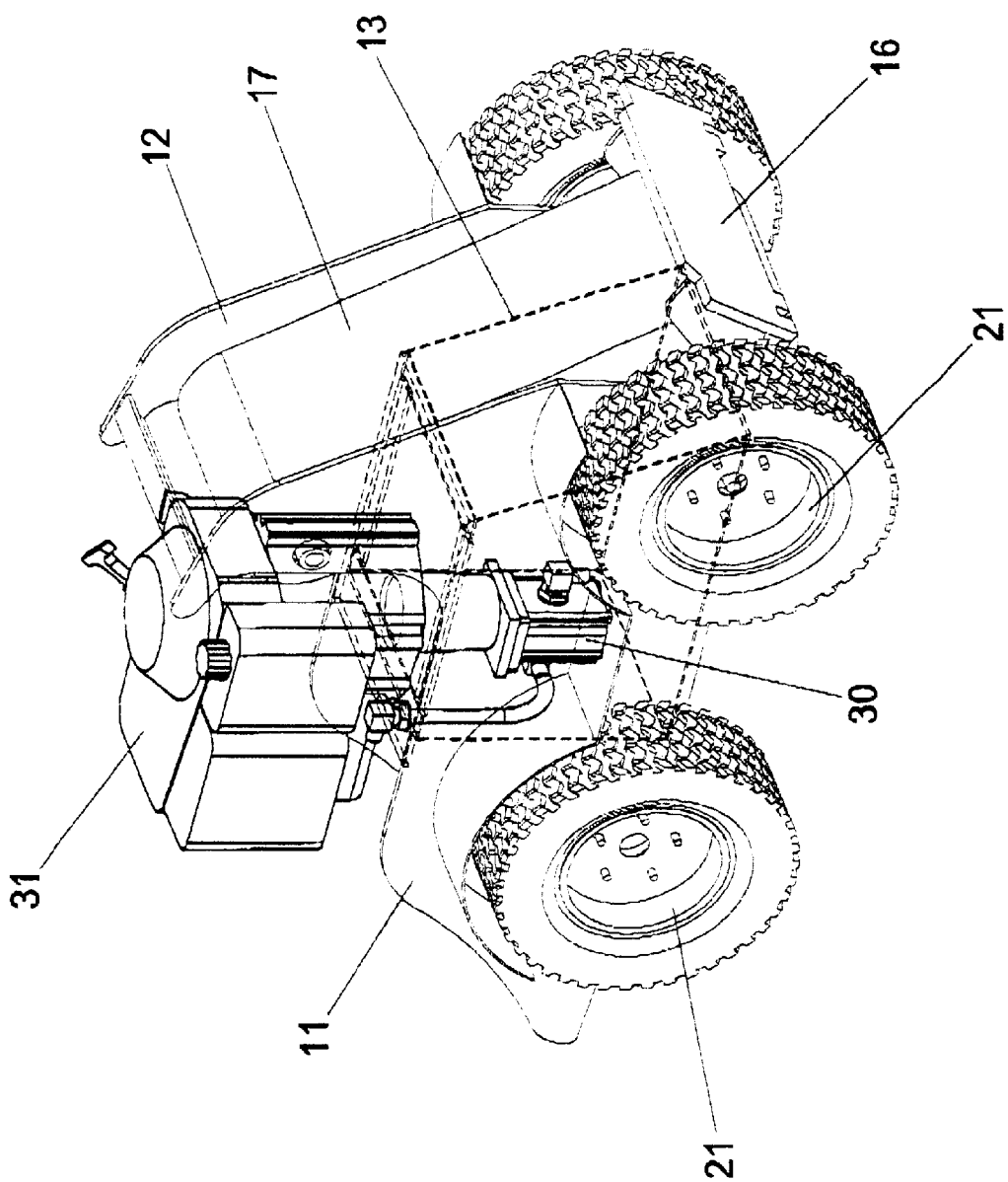
FIG. 5 is a perspective view of the engine and pump mechanism of the mini-loader of FIG. 1.

As shown in FIGS. 1–5, a skid-steer vehicle, in the form of a "mini-loader" 10, comprises a chassis formed from two spaced parallel steel plates 11, 12 fixed on either side of a metal tank 13 (shown in dotted outline in FIG. 5). The steel plates 11, 12 may be machine cut and may form the actual sides of the tank. The tank 13 not only serves as an oil reservoir for the hydraulic drive system of the mini-loader, but also forms a box-like structural part of the chassis. This form of construction is relatively simple and economical to manufacture.

A tread plate 14 extends between the rear ends of the side plates 11, 12, as shown in FIG. 3. The tread plate 14 serves as a platform on which the operator stands (and rides) during operation of the mini-loader. Preferably, the tread plate 14 is weighted, to act as a counterbalance to the load carried by a bucket 15 at the front of the mini-loader.

The mini-loader 10 is provided with two pairs of wheels 21. A mudguard 22 may be provided above the wheels 21 on each side of the mini-loader. The mudguards 22 are typically welded, bolted or otherwise fixed to the side walls 11, 12. The mudguards 22 may be used to carry equipment or accessories such as a battery and/or toolbox.

Typically, only one set of wheels is driven hydraulically by the mini-loader power plant. That is, either the front or the rear wheels are driven hydraulically. The driven wheels are each rotated by a hydraulic motor driven by a hydraulic pump via valve(s). Each wheel in the other (non-driven) set of wheels is driven from a respective one of the hydraulically-driven wheels by a chain 24. In this manner, the wheels on each side of the mini-loader rotate in unison.

The tank 13 which forms a structural part of the chassis also serves as the oil reservoir for the hydraulic system used to drive the mini-loader. As shown in FIG. 5, the hydraulic pump 30 is located within the reservoir 13. The pump is used to supply hydraulic fluid under pressure to drive the hydraulic motors coupled to the driven set of wheels 21, the hydraulic cylinders which operate the bucket arm, and auxiliary equipment which may be mounted to the mini-loader. The hydraulic pump 30 is itself driven by a motor, typically an internal combustion engine 31, mounted to the top plate of the tank 13. The engine 31 has a vertical drive shaft which extends into the tank 13 to drive the hydraulic pump 30.

The abovedescribed arrangement of engine, pump and oil tank enables the power plant to be constructed in a very compact form. This in turn, allows the size of the mini-loader to be reduced, permitting the mini-loader to be used in confined spaces. In addition, by locating the pump 30 in the tank 13, a separate intake hose is rot required for the pump.

The bucket 15 (or other attachment) is removably mounted to a mounting plate 16 by a "quick hitch" locking mechanism described later. The mounting plate 16 is pivotally connected to one end of a bucket arm 17, the other end of which is pivotally mounted on a pivot pin 18 extending between the side walls 11, 12 of the chassis.

The bucket arm 17 is of inverted channel configuration comprising a web and two end walls, the web being wide relative to the end walls. Such configuration provides a neat, aesthetically pleasing appearance since only the large flat web of the bucket arm is visible from the front of the mini-loader. The wide flat web of the channel-shaped bucket arm 17 not only hides the hydraulic hoses and cylinders under the arm, but also protects such hydraulic equipment and the bucket self-levelling mechanism (described below) from dirt and damage.

A 7-shaped console panel 19 is located between the side plates 11, 12, as shown in the drawings. The panel 19 forms the rear and top of a cover for the power plant in the engine bay. The lower end of the console panel 19 is pivotally mounted to the side walls 11, 12, enabling the whole console panel 19 to pivot rearwardly (as shown in FIG. 4) and expose the engine bay of the mini-loader.

The engine bay is closed by pivoting the console panel 19 upwardly to the position shown in FIGS. 1–3. At that position, the top forward ends of the control panel 19 can be bolted or otherwise fixed to the side plates 11, 12. Control levers 20 on the console panel are connected to the remainder of the hydraulic operating system by flexible hoses which permit the console panel 19 to be opened and closed.

The ability to pivot the control panel 19 rearwardly and open up the engine bay allows clear access to the engine 31. This facilitates servicing of the engine, as well as the installation and removal of the engine 31 and/or pump 30 from the tank 13. When such access is not required, the console panel can be pivoted upwardly and forwardly to close the engine bay and form a very compact body.

Figure 6:
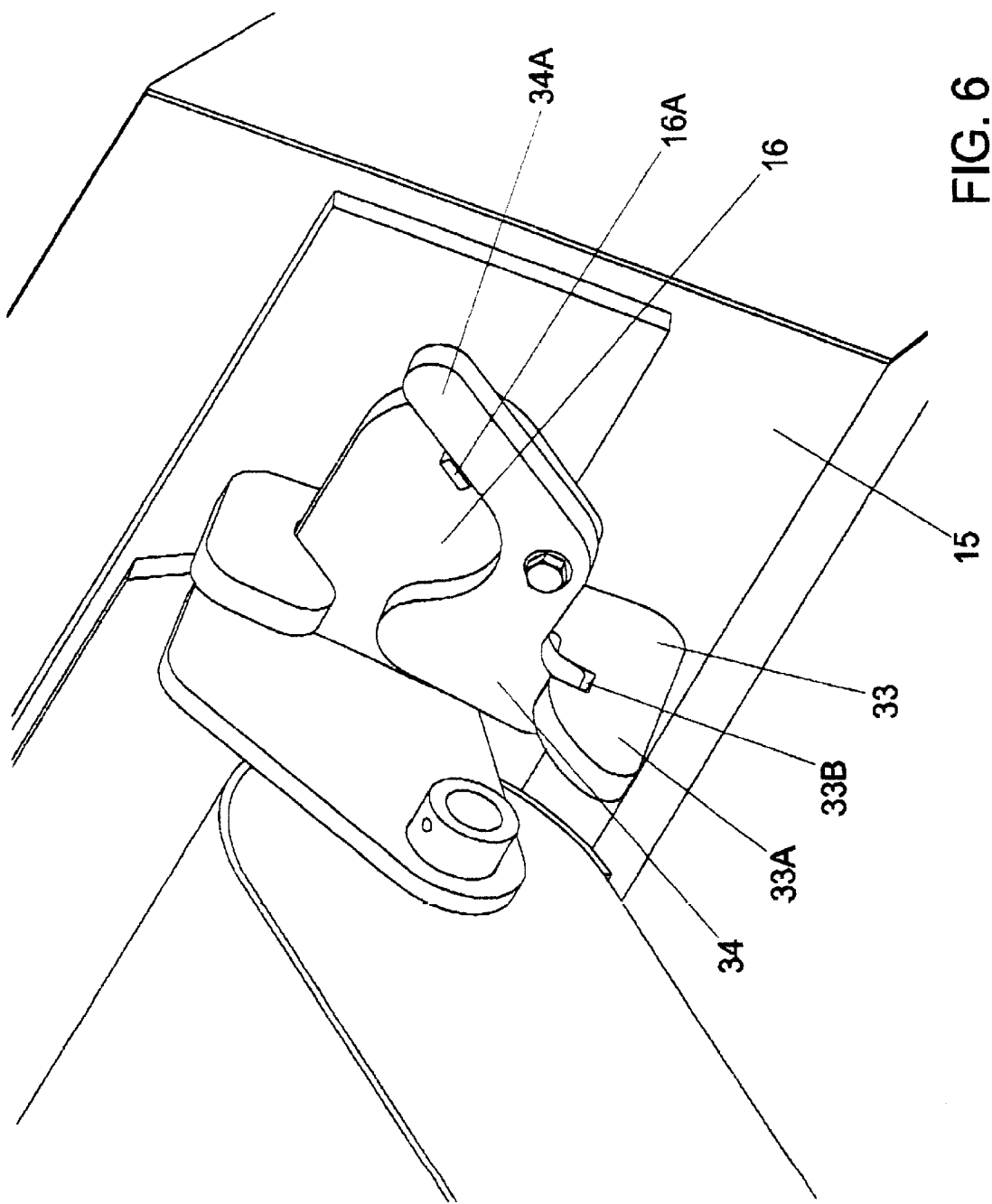
FIG. 6 is a perspective view of the bucket hitch mechanism of the mini-loader of FIG. 1, and FIGS. 7 and 8 are side views of the automatic bucket levelling mechanism of the mini-loader of FIG. 1, with the bucket in the lowered and raised positions, respectively.

The illustrated mini-loader is provided with a "quick hitch" locking mechanism which enables an operator to mount, and lock, the bucket 15 to the mounting plate 16 without the operator having to dismount from the tread plate 14. As shown in FIG. 6, the bucket 15 is provided with a pair of spaced C-shaped flanges or brackets 33 on the rear thereof. In use, the operator manoeuvers the mounting plate 16 to locate within the C-shaped brackets 33. This can be achieved by inserting the tilted mounting plate 16 into the brackets 33, and then rotating the mounting plate 16 hydraulically.

The mounting plate 16 also comprises a pair of toggle arms 34 pivotally mounted to the rear of the plate 16 at spaced locations corresponding to the mounting brackets 33 of the bucket 15. When the mounting plate 16 is inserted into the C-shaped mounting brackets 33, the toggle arms 34 pivot upwardly as they ride over the nose 33A of the bottom portion of each mounting bracket 33. However, once each toggle arm 34 clears the step at the back of each nose portion, the toggle arm drops down into a slot 33B and securely locks the mounting plate 16 in the mounting brackets 33. It would therefore be apparent that the bucket 15 can be mounted and locked, to the mounting plate 16 by manoeuvering the mounting plate 16 from the operator's console.

To remove the bucket 15 from the mounting plate 16, the outer extension 34A of each toggle arm 34 is kicked down to release the toggle arm from the slot 33B, and the plate 16 is tilted and withdrawn from the brackets.

Figure 7:
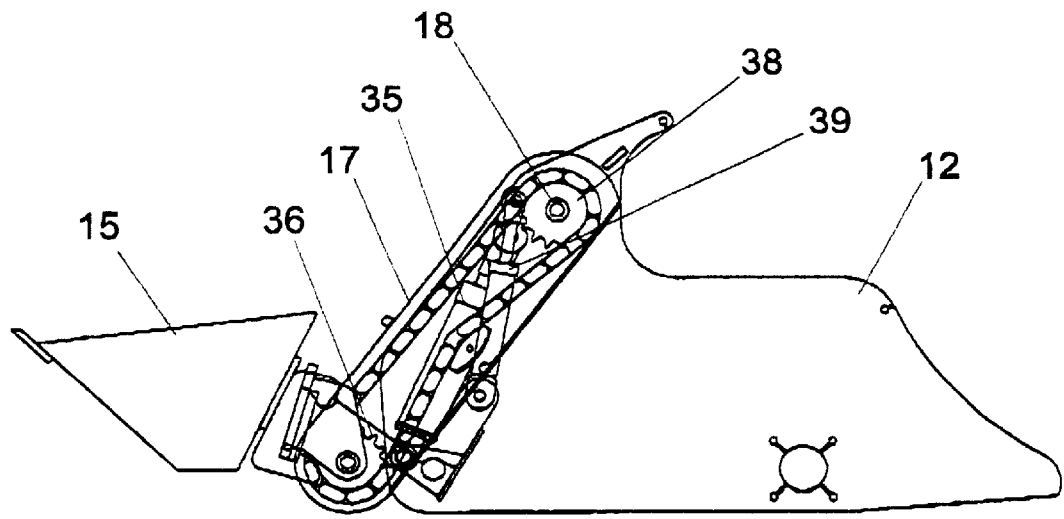
Figure 8:
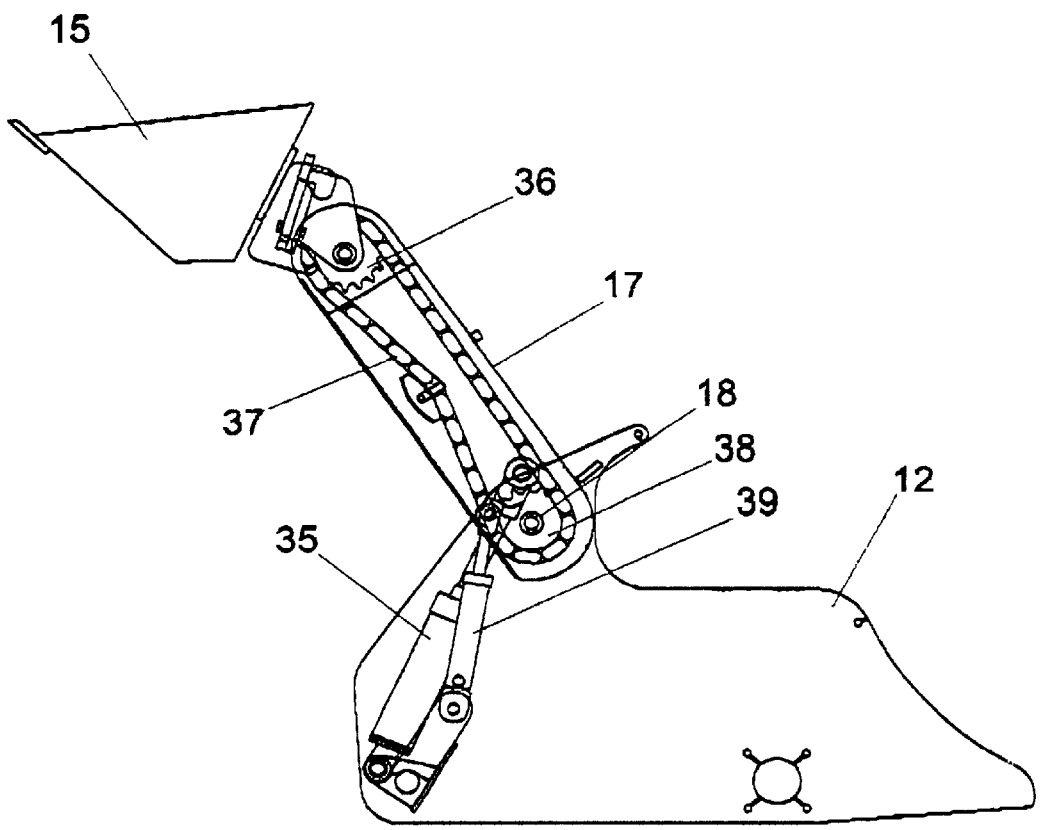

Another advantageous feature of the illustrated mini-loader is an automatic bucket levelling mechanism, depicted schematically in FIGS. 7 and 8. Although bucket levelling mechanisms are known, such mechanisms typically comprise parallelogram linkages and hydraulic cylinders extending upwardly from the bucket arms. In the illustrated bucket levelling mechanism, a chain and sprocket arrangement is used to maintain the bucket at a is constant orientation automatically as the bucket arm is raised and lowered.

As shown in FIGS. 7 and 8, the bucket 15 is mounted on the mounting plate 16 at the distal end of the bucket arm 17 whose proximal end is pivotally mounted on the pivot pin 18 extending between the side walls 11, 12. A hydraulic cylinder 35 is mounted between the bucket arm 17 and a transverse bar mounted between lower portions of the side walls 11, 12. The hydraulic cylinder 35 is driven by the hydraulic pump 30 to rotate the bucket arm 17.

A sprocket 36 is fixed to the mounting bracket 16, and is rotatable therewith about the pivot axis of the mounting bracket 16. (The term "rotatable" as used herein also means partially rotatable). An endless chain 37, or similar linkage, connects sprocket 36 with a sprocket 38 mounted on the chassis near the proximal end of arm 17, typically collinear with the pivot axis as arm 17. A hydraulic cylinder 39 is connected between sprocket 38 and a fixed lower point on the chassis of the mini-loader. The cylinder 39 is driven by pump 30, via a control valve on the console panel, to rotate sprocket 38. (In practice, only a small angular rotation is required). As sprockets 36 and 38 are linked by chain 37, any rotation of sprocket 38 causes a corresponding rotation of sprocket 36, thereby causing tilting of the bucket 15 mounted on plate 16. In this manner, hydraulic cylinder 39 is used to vary the orientation of bucket 15.

As the bucket arm 17 is raised and lowered by cylinder 35, and with sprocket 38 fixed in position by cylinder 39, the fixed lengths of chain 37 between sprockets 36, 38 cause rotation of sprocket 36 relative to the arm 17 such that the sprocket 36 maintains a substantially constant orientation relative to (fixed) sprocket 38. The rotation of sprocket 36 compensates for the otherwise opposite rotation of the distal end of arm 17 about the sprocket 38. Thus, the bucket 15 is automatically maintained at a substantially constant orientation as the bucket arm 17 is raised and lowered.

To change the orientation of bucket 15, e.g. to empty the bucket, the cylinder 39 is actuated to rotate sprocket 38, and hence sprocket 36 via the chain linkage.

It will therefore be apparent to those skilled in the art that the abovedescribed chain and sprocket arrangement results in the bucket 15 being self-levelling. That is, the bucket 15 maintains its orientation relative to the horizontal as the arm 17 is raised and lowered (unless sprocket 38 is itself rotated by cylinder 39). Moreover, the chain and sprocket mechanism allows greater angular displacement of the arm 17 and bucket 15 than would otherwise. be possible with a rigid parallelogram linkage in the same confined space. The self-levelling mechanism is able to be concealed within the channel-shaped arm 17, and does not detract from the appearance of the mini-loader.

The foregoing describes only one embodiment of the invention, and modifications which are obvious to those skilled in the art may be made thereto without departing from the scope of the invention. For example, the central portions of the chain may be replaced by rigid links.

Furthermore, the improvements disclosed herein such as the self-levelling mechanism, can be applied to other machinery and not only skid-steer vehicles.

The term "comprising" is used in the following claims in the inclusive sense, to mean the stated integers without necessarily excluding other integers.

The claims defining the invention are as follows:

1. A compact skid-steer earth-working machine having a chassis;

a lifting arm pivotally mounted to the chassis; and a power plant mounted on the chassis for powering movement of the machine and operation of the lifting arm, the power plant comprising:

a tank serving in use as a reservoir for hydraulic fluid, a hydraulic pump located within the tank, and an internal combustion engine mounted on top of the tank, the engine having a substantially vertical drive shaft projecting into the tank and operatively coupled to the pump.

2. A machine as claimed in claim 1, wherein the machine is a skid-steer loader.

3. A machine as claimed in claim 1, further including a panel having its lower end pivotally mounted to the chassis, the panel being pivotable between a closed position whereat it at least partially covers the power plant and an open position which provides access to the power plant.

4. A machine as claimed in claim 3, wherein the panel forms a rear wall and a top of a cover for the power plant.

5. A machine as claimed in claim 3, wherein the panel is a console panel having controls thereon for operation of the machine.

6. A machine as claimed in claim 1, further comprising a lifting arm having one end pivotally mounted to the machine chassis, the other end of the arm having a mounting member pivotally connected thereto for mounting a bucket, scoop or other attachment.

7. A machine as claimed in claim 6, further comprising a levelling mechanism for automatically maintaining the mounting member at a constant orientation as the arm is raised and lowered, the levelling mechanism comprising a first sprocket fixed to the mounting member and rotatable therewith about the pivot axis of the mounting member, a second sprocket mounted to the machine at the pivot axis of the bucket arm, and an endless chain interconnecting the first and second sprockets, such that as the lifting arm is raised or lowered, the first sprocket is rotated relative to the arm to maintain the mounting member at a substantially constant orientation.

8. A machine as claimed in claim 7, wherein the second sprocket is mounted for rotation about the pivot axis of the arm, further comprising means for rotating the second sprocket about its axis to thereby vary the orientation of the mounting member and any attachment mouuted thereon.

9. A machine as claimed in claim 8, wherein the rotating means is a hydraulic cylinder driven by the hydraulic pump and controllable by an operator of the machine.

10. A machine as claimed in claim 6, further comprising a locking mechanism for fixing a bucket or other attachment to the mounting member, the locking mechanism including at least one toggle arm on the rear of the mounting member which locks the bucket or other attachment to the mounting member.

11. A machine as claimed in claim 10, wherein the bucket or other attachment has at least one C-shaped mounting bracket adapted to receive the mounting member therein, the toggle arm being adapted to ride over an end portion of the mounting bracket as the mounting member is inserted in the bracket, and automatically locate in a recess in the bracket to thereby lock the mounting bracket to the mounting member.

12. A machine as claimed in claim 1, wherein the chassis includes two spaced parallel side walls fixed to opposite sides of the tank.

13. A machine as claimed in claim 12, wherein the side walls are steel plates which form opposite walls of the tank, further including a tread plate extending between the rear ends of the side walls to provide a platform on which an operator may stand.

14. A machine as claimed in claim 1, wherein the lifting arm is generally of inverted channel configuration and has a relatively wide central web forming the front face of the arm.

15. A skid steer mini-loader having a chassis;

a power plant mounted on the chassis for hydraulically powering the mini-loader, the power plant comprising a tank serving in use as a reservoir for hydraulic fluid, a hydraulic pump located within the tank, and an internal combustion engine mounted on top of the tank, the engine having a vertical drive shaft projecting into the tank and operatively coupled to the pump;

a panel pivotally mounted at its lower end to the chassis, the panel forming the rear wall and top of a cover for the power plant, the panel being pivotable rearwardly from a closed position to an open position to provide acess to the power plant.

16. A skid-steer mini-loader as claim in claim 15, wherein the panel is a console panel having controls thereon for operation of the mini-loader.

17. A skid-steer mini-loader as claimed in claim 15, wherein the chassis includes two spaced parallel side walls fixed to respective opposite sides of the tank.

18. A skid-steer mini-loader as claimed in claim 17, wherein the side walls are steel plates which form opposite walls of the tank, further comprising a tread plate extending between the rear ends of the side walls to form a platform upon which an operator may stand.

19. A skid-steer mini-loader as claimed in claims 15, the mini-loader having a lifting arm pivotally mounted to the chassis, the lifting arm being generally of inverted channel configuration and having a relatively wide central web which forms the front face of the lifting arm.

20. A hydraulically driven vehicle having a power plant, comprising a tank serving in use as a reservoir for hydraulic fluid;

a hydraulic pump located within the tank, a motor mounted on the tank, the motor driving the pump via a shaft projecting into the tank, and a panel having its lower end pivotally mounted to the chassis and being pivotable between a closed position whereat it at least partially covers the power plant and an open position which provides access to the power plant, wherein the panel is a console panel having controls thereon for operation of the vehicle.

* * * * *